US007384001B2

(12) United States Patent
Carvis et al.

(10) Patent No.: US 7,384,001 B2

(45) Date of Patent: Jun. 10, 2008

(54) METHOD AND SYSTEM FOR AUTOMATICALLY AND DYNAMICALLY MARKING A LABEL FOR A DEVICE

(75) Inventors: Daryl Cromer Carvis, Apex, NC (US); Philip John Jakes, Durham, NC (US); Raymond Gary Octaviano, II, Raleigh, NC (US); Howard Jeffrey Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 255 days.

(21) Appl. No.: 11/136,740

(22) Filed: May 24, 2005

(65) Prior Publication Data

US 2006/0270554 A1 Nov. 30, 2006

(51) Int. Cl.
*G06K 19/06* (2006.01)

(52) U.S. Cl. ...................... 235/492; 369/275; 503/226; 101/35; 400/61; 400/70; 400/76

(58) Field of Classification Search ............ 369/275.3, 369/275; 503/226; 374/102, 162; 235/492; 101/35; 400/61, 70, 76
See application file for complete search history.

(56) References Cited

U.S. PATENT DOCUMENTS

| | | | | |
|---|---|---|---|---|
| 5,292,713 | A | 3/1994 | Stenzel et al. | 503/226 |
| 5,462,909 | A | 10/1995 | Lakes et al. | 503/201 |
| 5,691,972 | A | 11/1997 | Tsuga et al. | 369/275.3 |
| 5,928,987 | A | 7/1999 | Tsugawa et al. | 503/200 |
| 6,182,565 | B1 * | 2/2001 | Takayama et al. | 101/35 |
| 2002/0181015 | A1 * | 12/2002 | Whale | 358/1.15 |
| 2006/0002448 | A1 * | 1/2006 | Parker | 374/102 |

FOREIGN PATENT DOCUMENTS

JP 2000-173238 6/2000

* cited by examiner

*Primary Examiner*—Michael G. Lee
*Assistant Examiner*—Allyson N Trail
(74) *Attorney, Agent, or Firm*—Sawyer Law Group LLP

(57) ABSTRACT

A device that requires a regulatory label includes a label affixed to a surface of the device and a marking mechanism in the device that detects a configuration setting associated with the device and alters a portion of the label based on the configuration setting such that the label indicates information related to the configuration setting of the device.

20 Claims, 4 Drawing Sheets

METHOD AND SYSTEM FOR AUTOMATICALLY AND DYNAMICALLY MARKING A LABEL FOR A DEVICE

FIELD OF THE INVENTION

The present invention relates to devices that require regulatory labels, and more particularly to a method and system for marking a label for a device automatically and dynamically.

BACKGROUND OF THE INVENTION

Many electronic devices require specially marked labels that indicate information mandated by government regulations. The information on the label typically indicates, for regulatory compliance and auditing purposes, a particular configuration of the device to which the label is fixed. For example, wireless communication cards and digital video disk (DVD) players are electronic devices that required such regulatory labels.

Wireless communication cards are commonly used in electronic computer systems, such as notebook and desktop computers, to enable the systems to connect to a wireless local area network (WLAN) for accessing the Internet or other systems on the network. Various countries designate specific channels and frequency ranges for unlicensed use by electronic computer systems and devices. Accordingly, a wireless communication card is configured to use specified channels and specified frequencies to comply with the regulations promulgated by the country into which the card will be sold and used. Moreover, the wireless communication card must have a regulatory label attached to it indicating the specific configuration of the card. By affixing such a label to the card, an end user is informed of the card's configuration, and an auditing agency can quickly determine whether the card is being shipped to the correct destination for regulatory purposes.

Similarly, a DVD player is configured to play DVDs in a particular region. The regulatory label must be attached to the DVD player prior to entering the retail market, and indicates the appropriate region code corresponding to the region into which the DVD player will be sold. The regulatory label prevents an end user from attempting to resell the DVD player in another region.

In both examples, the regulatory label is typically applied by an operator during the manufacturing or assembly process of either the device itself (e.g., the DVD player) or of the system (e.g., the computer system) into which the device (e.g., wireless communication card) is installed. Because different countries/regions can have different configurations, the operator can manually mark the appropriate configuration on the label. This process, however, is time-consuming and error prone. In another approach, the label can be marked by a programmed marking tool prior to applying the label to the device such that the operator is not required to manually mark the label. This approach, however, does not eliminate the risk of attaching the marked label to the wrong device, i.e., the indication on the label does not correspond to the device's configuration. Alternatively, a different label can be provided for each different configuration and the operator can choose the appropriate label to attach to the card. This process, however, is also error prone because it does not eliminate operator error and it is also expensive because the manufacturer must now stock a plurality of different labels each having a distinct part number.

Accordingly, what is needed is an improved method and system for providing a label with the correct regulatory markings for a device. The method and system should eliminate the risk of marking a label incorrectly or attaching a marked label that indicates an erroneous configuration. In addition, the method and system should simplify the assembly process and reduce the costs associated with managing multiple inventory items. The present invention addresses such a need.

BRIEF SUMMARY OF THE INVENTION

In one embodiment, a device that requires a regulatory label comprises a label affixed to a surface of the device and a marking mechanism in the device that detects a configuration setting associated with the device and alters a portion of the label based on the configuration setting. The resulting altered label indicates information related to the configuration setting of the device.

According to the embodiment of the present invention, the device itself is capable of a sensing its configuration setting and of automatically marking its own label based on its configuration setting. Because the device is self aware, i.e., it is aware of its configuration, it is self-marking. Accordingly, operator error is eliminated because the operator is not required to mark the label, either manually or via a marking tool. Also, for a device that can have multiple configurations, one generic label can be used, as opposed to specific labels for each of the configurations. In addition, a smaller device that is embedded in a larger system, e.g., a wireless communication card in a laptop computer system, can be configured after it has been installed in the larger system thereby providing greater flexibility for manufacturers.

DETAILED DESCRIPTION OF THE INVENTION

The present invention relates to devices that require regulatory labels, and more particularly to a method and system for marking a label for a device automatically and dynamically. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

According to a preferred embodiment of the present invention, a device that requires a regulatory label comprises a marking mechanism that is capable of detecting the device's configuration setting. The marking mechanism then automatically alters a portion of a label that is attached to the device based on the device's configuration setting. The resulting label reflects the device's configuration setting and preferably complies with regulatory requirements.

Figure 1:
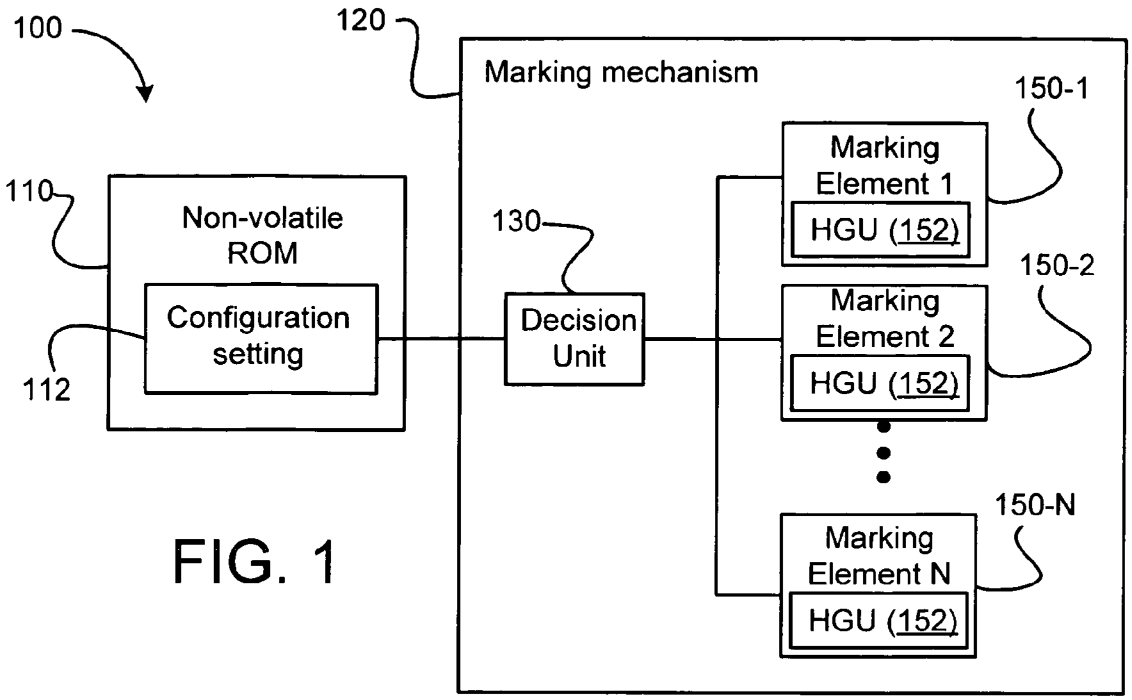
FIG. 1 is a block diagram of a device requiring a regulatory label according to an embodiment of the present invention.

FIG. 1 is a schematic block diagram of a device requiring a regulatory label according to an embodiment of the present invention. The device 100 includes a non-volatile read only memory structure 110 coupled to a marking mechanism 120. The non-volatile read only memory (ROM) structure 110 typically stores a configuration setting 112 associated with the device 100. For example, in a wireless communication card, the non-volatile ROM 110 can be an EEPROM that stores radio settings for wireless communication in a particular country and instructions for enabling or disabling certain features, e.g., OFDM modulation, 5 GHz radios, according to regulations in a particular country. The configuration setting 112 typically corresponds to a country or region into which the device will be sold and/or used.

According to a preferred embodiment of the present invention, the marking mechanism 120 includes a decision unit 130 coupled to a plurality of marking elements 150-1 to 150-N (collectively 150). Each marking element 150 is capable of marking an associated portion of a label (not shown) attached to a surface of the device 100.

In operation, the marking mechanism 120 receives the configuration setting 112 from the non-volatile ROM 110 and the decision unit 130 uses the configuration setting 112 to select at least one of the marking elements 150-1 to 150-N to mark the label attached to the surface of the device 100. The configuration setting 112 can either be pushed or pulled from the non-volatile ROM 110 to the marking mechanism 120. In one version, the configuration setting 112 is received by the marking mechanism 120 during an initial power on (or initialization) of the device 100.

In one version, the label comprises a thermal sensitive material that changes its appearance when it is heated above a predetermined temperature. For example, portions of the label that are exposed to a temperature exceeding the predetermined temperature can change its color. In this version, each marking element 150 includes a heat generating unit (HGU) 152, such as a resistor. Each HGU 152 is preferably located on or near the surface of the device 100 beneath the associated portion of the thermal sensitive label that will be marked by the corresponding marking element 150. Accordingly, selected portions of the label can be altered by the marking element(s) 150 selected by the decision unit 130 based on the configuration setting 112 for the device 100.

Figure 2:
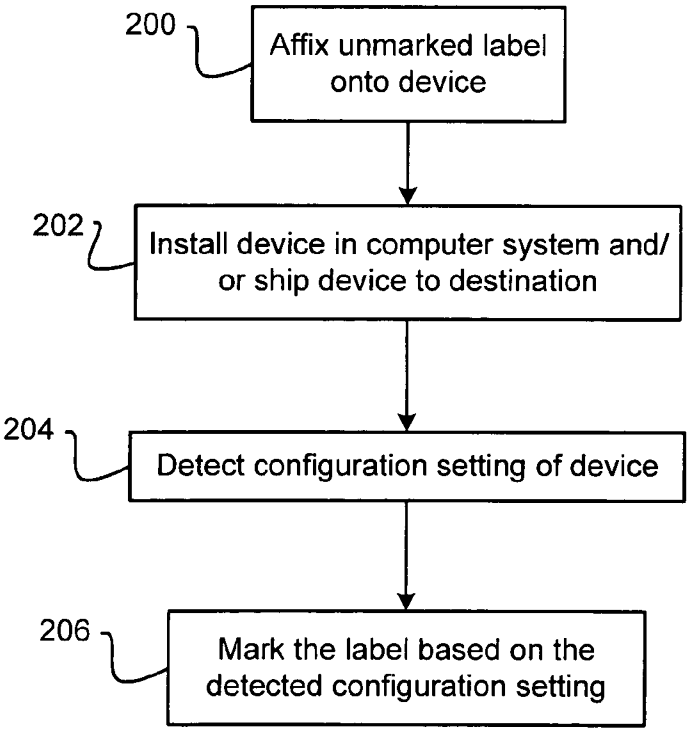
FIG. 2 is a flowchart illustrating a process of marking a label for a device according to an embodiment of the present invention.

FIG. 2 is a flowchart of a process for marking a regulatory label attached to a device according to a preferred embodiment of the present invention. Referring to FIG. 1 and FIG. 2, the process begins by affixing an unmarked regulatory label onto the device 100 (step 200). Preferably, the label is permanently attached to the device 100 to prevent tampering by an end user.

Figure 3A:
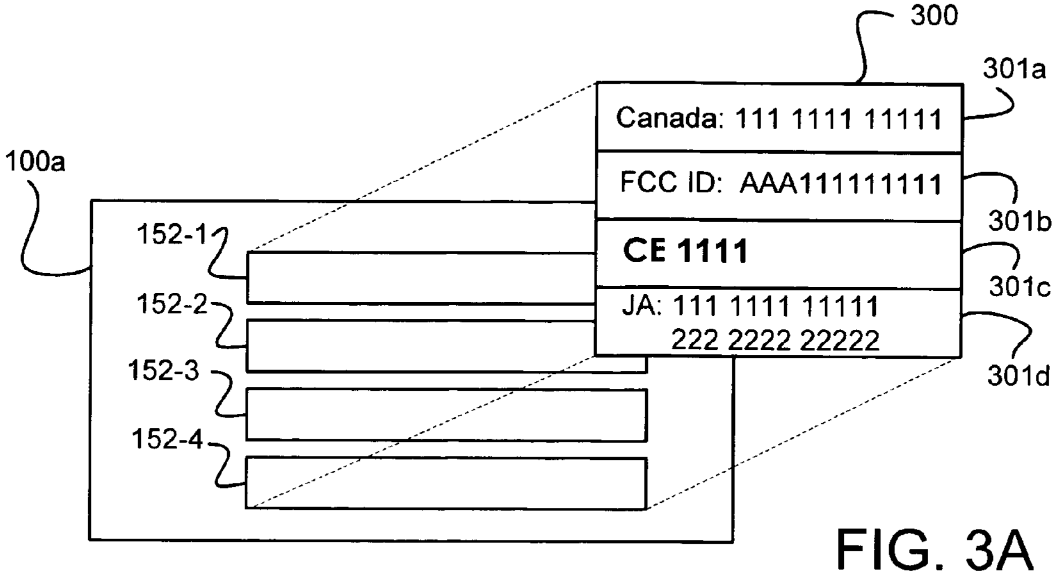
FIG. 3A-3C illustrate an exemplary regulatory label according to an embodiment of the present invention.
Figure 3B:
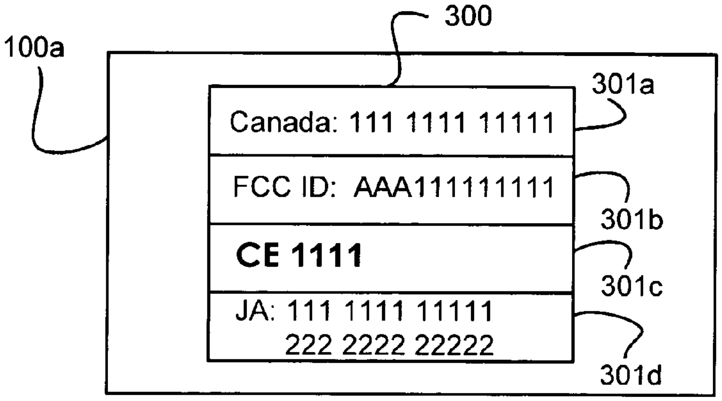

FIG. 3A and FIG. 3B illustrate an exemplary unmarked regulatory label 300 for a wireless communication card 100*a* according to a preferred version of the present invention. The label 300 preferably includes all possible country certifications 301*a*-301*d*, and therefore is generic to all wireless communication cards 100*a* regardless of their respective configurations. For other devices 100, the label can include other information, e.g., region codes for DVD players, that is required by government regulations. According to a preferred version, the regulatory label 300 is placed over the HGUs 152-1 to 152-4 associated with the marking elements 150-1 to 150-4. Each HGU 152-1 to 152-4 is aligned beneath a corresponding country certification 301*a*-310*d*.

Referring again to FIG. 2, after the unmarked label 300 is affixed to the surface of the device 100, the device 100 can be installed in a computer system if the device 100 is a peripheral component such as a wireless communication card and/or shipped to its destination (step 202). Note that the device 100 can be installed and/or shipped before the label 300 is marked. In the case of the installed device 100, this allows the device 100 to be configured after it has been installed in the computer system. Advantages of this aspect will be discussed in more detail later.

Once at the destination, the device 100 or computer system in which the device 100 is installed can be powered-on and the marking mechanism 120 in the device 100 detects the configuration setting 112 of the device 100 (step 204). Based on the detected configuration setting 112, the marking mechanism 120 marks the unmarked label 300 (step 206) such that the label indicates information related to the configuration setting 112 of the device 100.

In a preferred embodiment, the marking mechanism 120 retrieves the configuration setting 112 from the non-volatile ROM 110 and the decision unit 130 determines which of the plurality of marking elements 150 to activate based on the configuration settings 112. The activated marking element(s) 150 then uses its associated HGU 152 to cause the corresponding portion of the label 300 to change its appearance (color). In a preferred embodiment, the marking on the label 300 is irreversible, i.e., permanent.

Figure 3C:
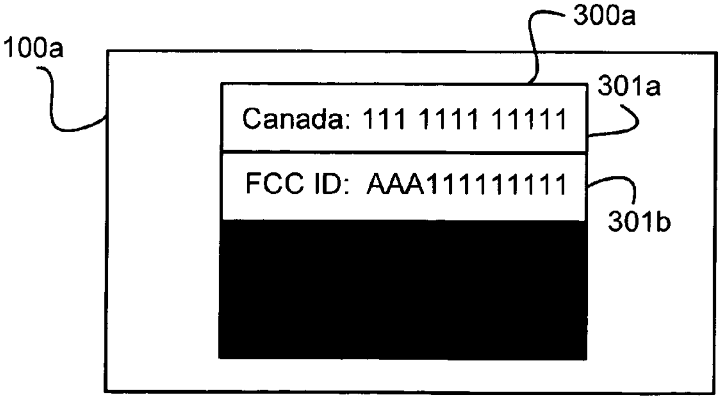

FIG. 3C illustrates the label 300*a* after it has been marked by the marking mechanism 120 according to a preferred version of the present invention. In this example, the configuration setting 112 indicates that the device 100 complies with Canadian (301*a*) and FCC (301*b*) certifications. Accordingly, the decision unit 130 activates marking mechanisms 150 associated with HGUs 152-3, 152-4 beneath the certifications pertaining to ETSI (301*c*) and Telic (301*d*). As a result, the portions of the label 300*a* including the ETSI (301*c*) and Telic (301*d*) certifications are altered (darkened). The resulting label 300*a* indicates the configuration setting 112 of the device 100.

In the example illustrated in FIG. 3C, the inapplicable regulatory certification(s) is obscured, i.e., blacken-out. In other cases, other markings can be applied that effectively indicate the same information. For example, a check mark or other indicator can appear adjacent to the applicable certifications. Alternatively, the marking can be indicative of the inapplicable certifications.

According to the preferred embodiments of the present invention, the device 100 onto which the label 300 is attached is capable of marking the label 300. Thus, the label 300 can be a generic label 300 for the device type thereby eliminating the need to stock multiple label types for a single device type. Moreover, because the device 100 is self-marking, an operator is not required to mark the label 300, either manually or via a marking tool. This then eliminates the risk of operator error.

Furthermore, because the device 100 is self-marking, the label 300 can be attached to the device 100 before the device 100 has been configured. This is particularly useful because it allows an unconfigured device 100, such as a wireless communication card, to be built into the enclosure of another system when the configuration of the system is not yet determined. In that situation, the device's eventual configuration setting 112 is determined by the system's destination country or region. Once the destination country or region is identified, the configuration setting 112 for the device 100 is determined and the label 300 can be marked accordingly.

For example, in a co-pending U.S. patent application entitled, METHOD AND SYSTEM FOR CONFIGURING A COMMUNICATION CARD IN A COMPUTER SYSTEM, U.S. application Ser. No. 11/081,343, assigned to the assignee of the present patent application and filed on Mar. 15, 2005, a self-configuring wireless communication card is described. In a preferred embodiment, the wireless communication card retrieves information relating to a destination country from the computer system in which the card is installed, and uses the retrieved information to select and load a corresponding configuration setting 112.

Figure 4:
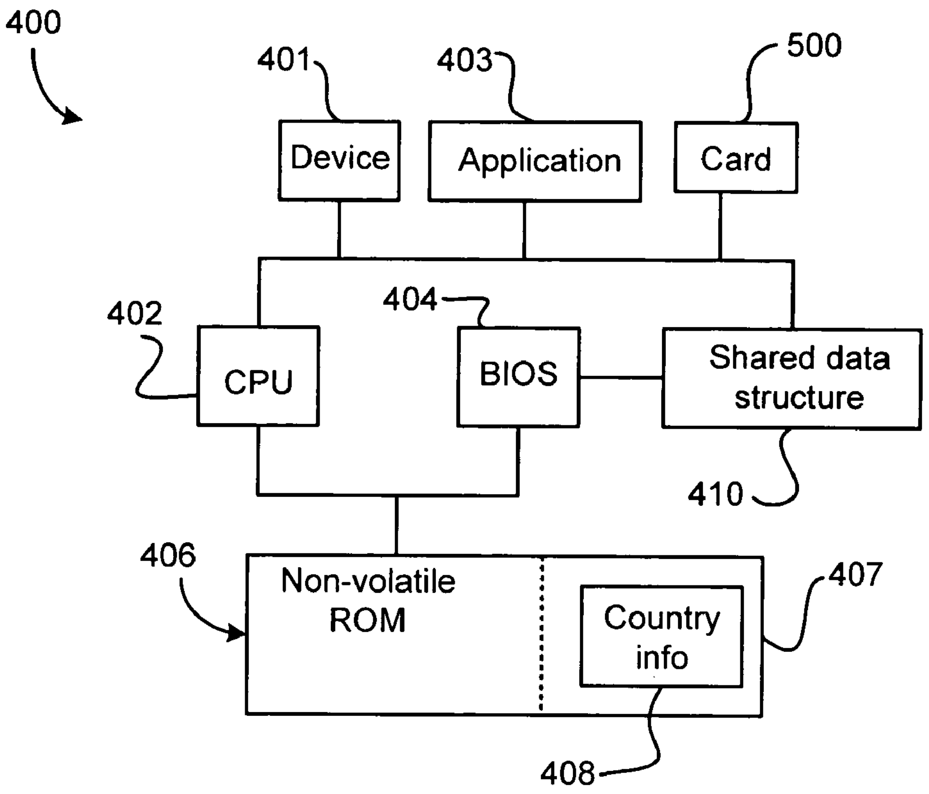
FIG. 4 is a block diagram of an exemplary computer system according to an embodiment of the present invention.

FIG. 4 is a block diagram of the computer system utilizing the self-configuring wireless communication card according to the preferred embodiment of the present invention. The computer system 400 can be a desktop or laptop computer or any other system that uses a wireless communication card, e.g., a PDA or the like. The computer system 400 includes at least one central processing unit (CPU) 402, a non-volatile read only memory structure 406, a plurality of peripheral devices 401, applications 403, and at least one self-configuring wireless communication card 500. The CPU 402 generally controls the interaction between the various devices 401, cards 500, and applications 403 in a known manner. The non-volatile read only memory structure 406 can be an electrically erasable programmable ROM (EEPROM) that includes a locked section 406 that stores permanent information, such as the system's serial number.

The computer system 400 also includes a BIOS module 404 that performs a boot sequence when the computer system 400 is powered up or restarted. The BIOS module 404 has access to the non-volatile ROM 406 and is also coupled to a shared data structure 410. The shared data structure 410 is accessible by the at least one communication card 500.

Figure 5:
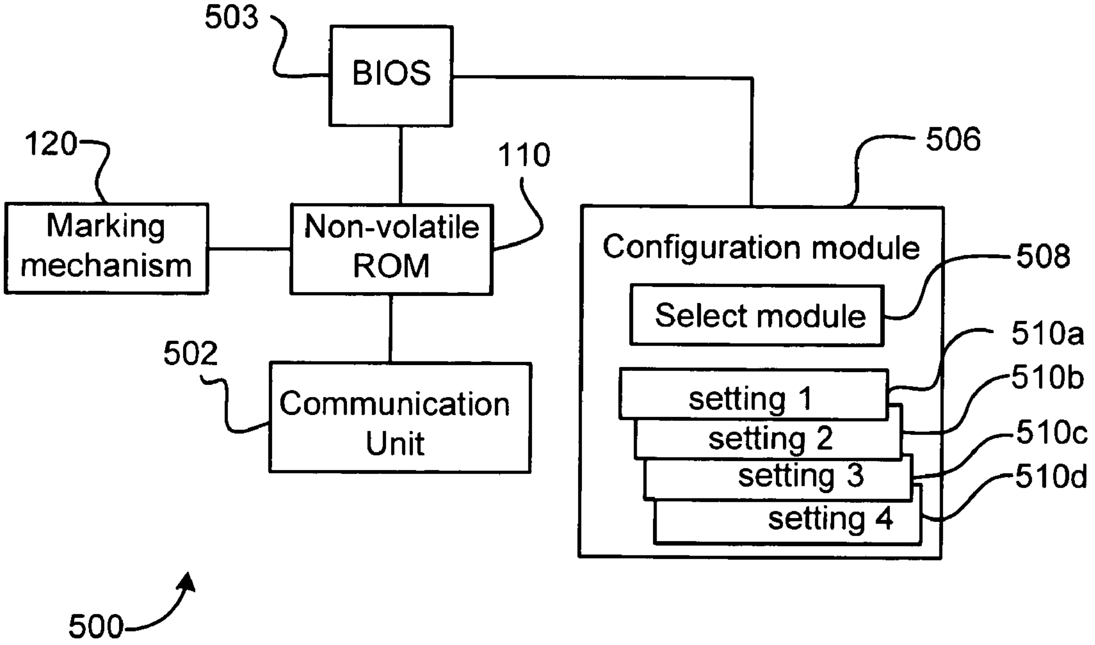
FIG. 5 is block diagram of a wireless communication card according to an embodiment of the present invention.

FIG. 5 is a schematic block diagram of a self-configuring wireless communication card that requires a regulatory label 500 according to an embodiment of the present invention. The wireless communication card 500 includes non-volatile ROM 110 coupled to the marking mechanism 120, as well as a communication card BIOS 503, a communication unit 502 and a configuration module 506. According to a preferred embodiment, the configuration module 506 includes a selection module 508 and a plurality of configuration settings 510*a*-510*d*.

The configuration module 506 is coupled to the BIOS 503 that is coupled to the non-volatile ROM 110. The communication unit 502 provides the functionality of the communication card 500 in a known manner using the configuration setting that complies with the country in which the computer system 100 is used.

According to a preferred embodiment, the communication card 500 configures itself during a first booting sequence by interrogating the computer system 400 for information relating to which country the computer system 400 will be used, and then selecting and loading the appropriate configuration setting 510*a*-510*d* corresponding to the country of use. Once the appropriate configuration setting is loaded, the marking mechanism 210 marks the label.

Figure 6:
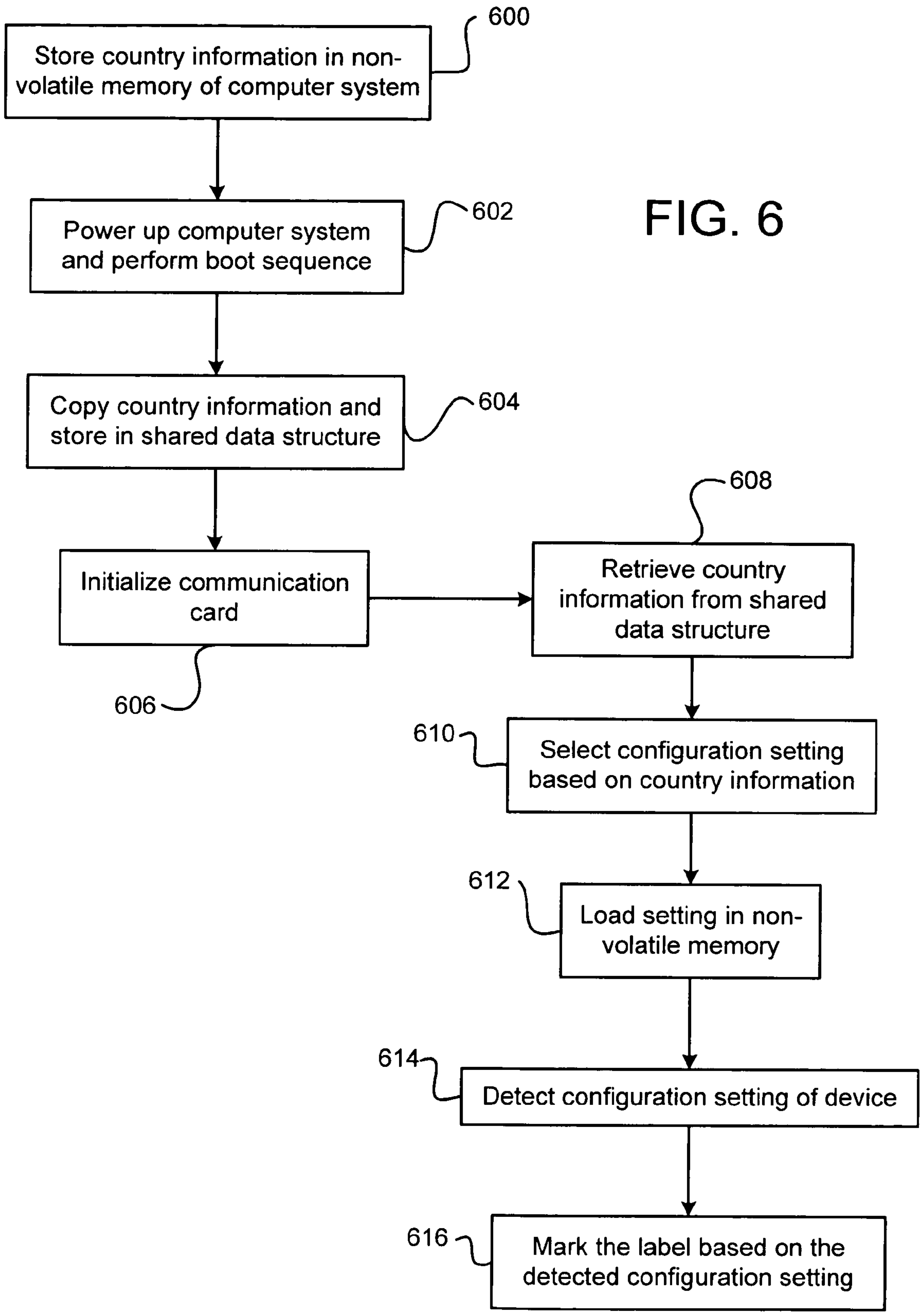
FIG. 6 is a flowchart illustrating a process of configuring a wireless communication card and marking a label for the wireless communication card in a computer system according to an embodiment of the present invention.

FIG. 6 is a flowchart illustrating a process for configuring and marking the communication card 500 according to a preferred embodiment of the present invention. Referring to FIG. 4, FIG. 5 and FIG. 6, the process begins by storing information 408 relating to the country of use (referred to as "country information") in the locked section 407 of the non-volatile read only memory structure 406, e.g., EEPROM, of the computer system 400 (step 600). In a preferred embodiment, the country information 408 is a setting indicator that corresponds to the country in which the computer system 400 will be used and indicates which configuration setting out of a plurality of configuration settings 510*a*-510*d* will be used for the communication card 500.

In a preferred embodiment, the setting indicator 408 is determined when an end user identifies the country of use during an ordering process. During assembly of the computer system 400, the setting indicator 408 can be stored in the locked section 407 of the EEPROM 406 in a manner known to those skilled in the art. Once the country information 408 is stored in the EEPROM's locked section 407, the computer system 400 can be shipped to its destination. Once received, the computer system 400 is powered up and the BIOS 404 performs an initial boot sequence (step 602).

According to a preferred embodiment of the present invention, the BIOS 404 copies the setting indicator 408 from the locked section 407 of the EEPROM 406 and stores it in the shared data structure 410 (step 604). During the boot sequence, the BIOS 404 initializes the wireless communication card 500 by locating and executing the communication card BIOS 503 in the communication card 500 (step 606). As stated above, when assembled, the communication card 500 is not configured. Accordingly, when the communication card BIOS 503 checks for configuration settings in the card's non-volatile ROM 110, it will find that the settings are not present. In that case, the communication card BIOS 503 calls the configuration module 506, which checks the shared data structure 410 in the computer system 400 and retrieves the setting indicator 408 stored therein (step 608).

The select module 508 in the configuration module 506 uses the setting indicator 508 to select a configuration setting, e.g., 510*a*, corresponding to the setting indicator 508 (step 610), and the selected configuration setting 510*a* is then loaded into the communication card's non-volatile ROM 110 (step 612) thereby configuring the communication card 500. Once the card is configured, the marking mechanism 120 detects the configuration setting 510*a* (step 614) and marks the label 300 based on the detected configuration setting 510*a* (step 616) preferably according to the process described above.

According to a preferred embodiment of the present invention, if a configured wireless communication card 500 fails, a replacement communication card 500 that is not configured and that has an unmarked label can be shipped to the end user and installed in the computer system 400. To configure the replacement communication card and to mark its label, steps 606 through 616 of FIG. 6 can be performed because the setting indicator 408 is stored in the computer system 400. Similarly, instead of building the computer system 400 with the wireless communication card 500, the communication card 500 can be installed after assembly as an option. Again, in this situation, the newly installed communication card 500 can configure itself by retrieving the setting indicator 408 from the computer system 400, selecting the appropriate configuration setting 510*a* based on the setting indicator 408, loading the configuration setting 510*a* into the card's EEPROM 504, and then mark its label.

According to versions of the present invention, a device that requires a regulatory label is capable of marking its own label based on its configuration setting. In a preferred embodiment, the device includes a marking mechanism that receives the configuration setting from the device's non-volatile ROM, and uses the configuration setting to select at least one marking element to mark a portion of the label such that the resulting label indicates information related to the device's configuration setting.

By allowing the device to mark its own label automatically, computer system manufacturers, computer repair shops, and options warehouses need only stock one generic label for a device type, instead of several differently configured labels for a device type. Moreover, operator error associated with erroneously marking the label manually or via a marking tool is eliminated.

The present invention is directed to marking a label for a device automatically and dynamically. The present invention has been described in accordance with embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A device comprising:

a label affixed to a surface of the device; and a marking mechanism integrated into the device, the marking mechanism being separate from the label affixed to the surface of the device, the marking mechanism detecting a configuration setting of the device, and marking a portion of the label with information based on the configuration setting detected, the information marked on the label being information mandated by a government regulation.

2. The device according to claim 1, wherein the label is permanently affixed to the device.

3. The device according to claim 1, further comprising:

a non-volatile read-only memory structure coupled to the marking mechanism, the non volatile read-only memory structure storing the configuration setting of the device.

4. The device according to claim 3, wherein the marking mechanism includes a plurality of marking elements, each marking element marking a corresponding portion of the label.

5. The device according to claim 4, wherein the marking mechanism detects the configuration setting of the device stored in the non volatile read-only memory structure, and based on the configuration setting detected, activates at least one of the marking elements to mark the label.

6. The device according to claim 5, wherein each of the marking elements comprises a heat generating unit located on or near the surface where the label is affixed and in contact with the corresponding portion of the label, and wherein the label comprises a thermal sensitive material that changes its appearance when heated above a predetermined temperature, such that when a marking element is activated, the heat generating unit of the marking element causes the corresponding portion of the label to change its appearance.

7. The device according to claim 1, wherein the device is a digital video disk player.

8. The device according to claim 1, wherein the device is a wireless communication card.

9. The wireless communication card according to claim 8, further comprising:

a non-volatile read-only memory structure coupled to the label marking mechanism; and a configuration module coupled to the non-volatile read-only memory structure, the configuration module retrieving information stored in a computer system to which the communication card is coupled, the information relating to a country in which the computer system will be used, the configuration module comprising:

a selection module; and a plurality of configuration settings, wherein each configuration setting corresponds to at least one country, wherein the selection module selects a configuration setting from the plurality of configuration settings stored in the communication card based on the retrieved information, the configuration module loads the selected configuration setting into the non-volatile read-only memory structure, and the marking mechanism retrieves the configuration setting from the non-volatile read-only memory structure.

10. The device according to claim 1, wherein the information marked on the label is permanent.

11. The device according to claim 1, wherein the information marked on the label comprises at least one of a country certification, a regulatory agency certification, a standards organization certification, an auditing agency certification, a region code, an operating frequency of the device, and an operating channel of the device.

12. A computer system comprising:

at least one CPU;

a first non-volatile read only memory structure coupled to the at least one CPU, the memory structure including a locked section;

a system BIOS coupled to the at least one CPU;

a shared data structure coupled to the system BIOS; and at least one wireless communication card coupled to the CPU, the wireless communication card comprising:

a label affixed to a surface of the wireless communication card;

a second non-volatile read only memory structure;

a configuration module coupled to the second non-volatile read only memory structure, the configuration module for retrieving information stored in the computer system, the information relating to a country in which the computer system will be used, the configuration module comprising:

a select module; and a plurality of configuration settings, wherein each configuration setting corresponds to at least one country; and a label marking mechanism coupled to the second non-volatile read only memory structure, wherein the select module selects a configuration setting from the plurality of configuration settings stored in the communication card based on the retrieved information, the configuration module loads the selected configuration setting into the second non-volatile read only memory of the communication card, and the label marking mechanism retrieves the configuration setting associated with the communication card and alters a portion of the label based on the configuration setting such that the label indicates information related to the configuration setting of the wireless communication card.

13. A method for marking a device, the method comprising:

affixing an unmarked label onto a surface of the device;

detecting by the device a configuration setting of the device; and marking by a marking mechanism integrated into the device a portion of the unmarked label with information based on the configuration setting detected, the information marked on the label being information mandated by a government regulation.

14. The method according to claim 13, wherein affixing the unmarked label includes:

permanently attaching the unmarked label to the device.

15. The method according to claim 13, wherein detecting the configuration setting includes:

retrieving the configuration setting from a non-volatile read-only memory structure in the device.

16. The method according to claim 13, further comprising:

providing a plurality of marking elements in the marking mechanism of the device, each marking element marking a corresponding portion of the unmarked label.

17. The method according to claim 16, wherein marking a portion of the unmarked label includes:

activating at least one of the marking elements based on the configuration setting detected, and marking the portion of the unmarked label corresponding to the at least one activated marking element.

18. The method according to claim 17, wherein each of the marking elements comprises a heat generating unit located on or near the surface where the unmarked label is affixed and in contact with the corresponding portion of the unmarked label, and wherein the unmarked label comprises a thermal sensitive material that changes the label's appearance when heated above a predetermined temperature, and wherein marking a portion of the unmarked label further includes activating the heat generating unit of the at least one marking element and causing the corresponding portion of the label to change the label's appearance.

19. The method according to claim 13, wherein the information marked on the label is permanent.

20. The method according to claim 13, wherein the information marked on the label comprises at least one of a country certification, a regulatory agency certification, a standards organization certification, an auditing agency certification, a region code, an operating frequency of the device, and an operating channel of the device.

* * * * *